Sept. 16, 1941.     R. E. DRACHENBERG     2,255,764
MACERATOR AND JUICE EXTRACTOR
Filed Nov. 13, 1939
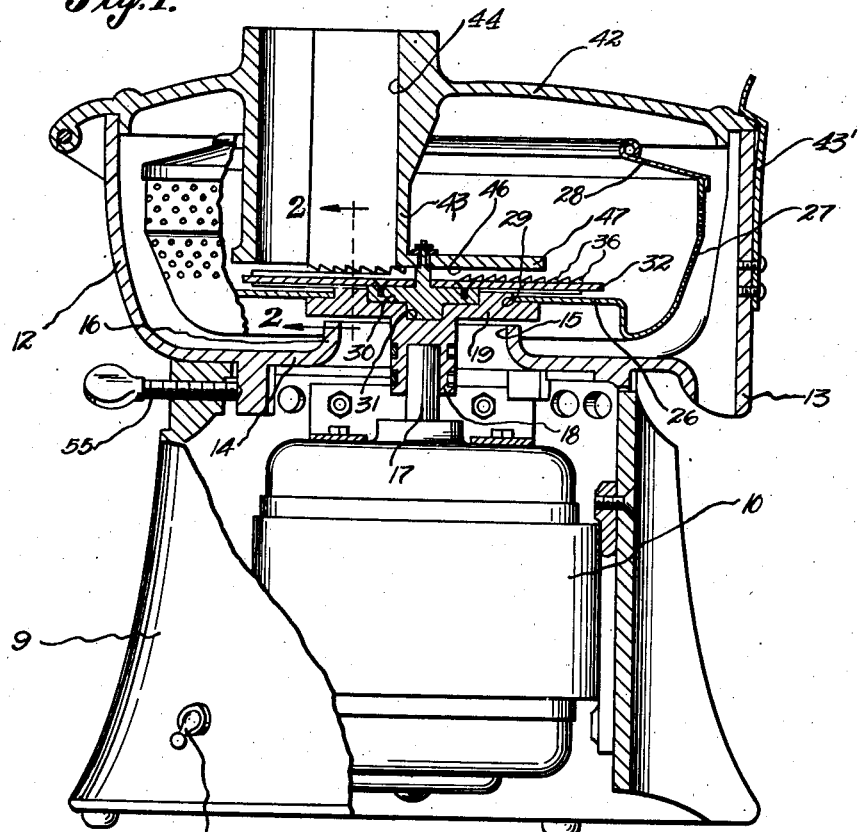
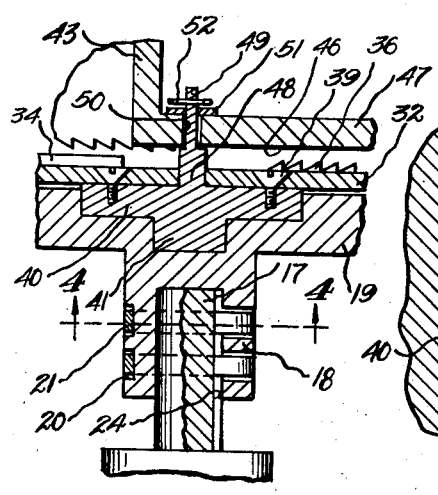
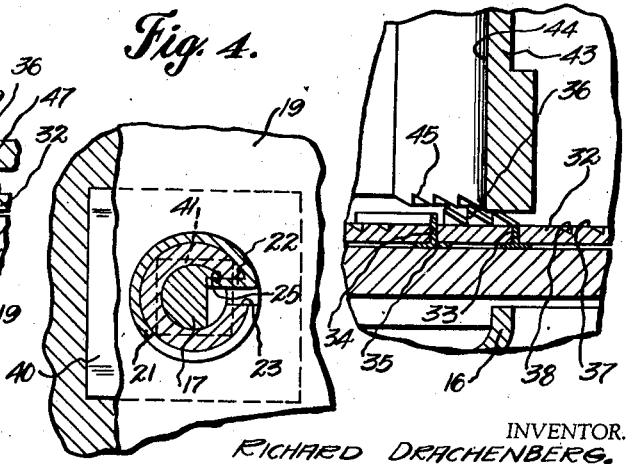
INVENTOR.
RICHARD DRACHENBERG.
BY
ATTORNEY.

Patented Sept. 16, 1941

2,255,764

UNITED STATES PATENT OFFICE 2,255,764

MACERATOR AND JUICE EXTRACTOR

Richard E. Drachenberg, Grosse Pointe, Mich.

Application November 13, 1939, Serial No. 304,201

7 Claims. (Cl. 146—3)

My invention relates to a macerator and juice extractor adapted for use in macerating vegetables, fruits, and the like, and extracting juice from the macerated pulp. This invention constitutes a continuation in part of my co-pending applications, Serial No. 143,548 filed May 19, 1937 and Serial No. 268,670 filed April 19, 1939.

In machines of this type the fruit or vegetable to be operated upon is brought into contact with a movable and preferably rotating macerating member in such a manner that the macerating member will engage and macerate or reduce to a pulp the fruit or vegetable. The material is fed onto the macerating member through a chute which is stationary and which overlies a part of the area defined by the macerating member when it is rotating. Thus the macerating member will engage the fruit or vegetable projecting beyond the end of the chute and sever this part from the part still contained within the chute. The material so engaged and severed will be thoroughly macerated and carried clear of the chute by the macerating member. This pulp is then projected from the macerating member into a rotating, perforated strainer in which the macerating member is positioned. The rotating strainer serves, through centrifugal action, to separate the juice from the pulp, the juice passing into the enclosing receptacle from which it is led off by any suitable means.

In machines of this type it is customary to use a high speed motor to drive the macerator. It is customary also to use a cover for the enclosing receptacle, on which cover the chute is mounted. After use of the machine for a period of time it is necessary that the cover be removed so that the accumulated pulp, from which the juice has been extracted, can be removed. Experience has shown that in use of a machine of this type, when the motor is shut off and the cover removed, the macerating member will continue to rotate for some time at high speeds. Consequently, it becomes possible for the person to place his hand on the rotating macerator after the cover has been removed. To avoid this I have provided, described herein, a structure so arranged that when the cover is removed the macerating member is also removed or moved out of engagement with the rotating member so that the macerating member will not be rotated after the cover is removed.

Another object of the invention is the provision of a cover having a rotatable member thereon adapted, when the cover is in closing position, for interengaging with a rotating driving member which will serve to rotate the macerating member after the cover is in position.

Another object of the invention is the provision in a machine of this type of a structure having a cover with a macerating member attached and rotatable relatively thereto, while limited in axial movement relatively thereto.

Another object of the invention is the provision of a machine of this type which will be simple in structure, durable, compact and highly efficient in use.

Other objects will appear hereinafter.

In the specification and drawing I have set forth and described the preferred embodiment of the invention although it will appear, from the description, to one skilled in the art, that various modifications and changes may be made in the invention without departing from the spirit, function and results thereof and it is my intention that such modifications shall be embraced herein.

Fig. 1 is a side illustration of the invention with parts broken away and parts shown in section.

Fig. 2 is a fragmentary view, slightly enlarged, taken on line 2—2 of Fig. 1.

Fig. 3 the fragmentary view, slightly enlarged, with parts shown in side elevation and parts broken away, showing the connection means used in the invention.

Fig. 4 is a fragmentary sectional view taken on line 4—4 of Fig. 3.

In the drawing I have illustrated the invention as embodying a standard 8 in which is suitably mounted an electric motor 10 controlled by the switch 11. Supported on the standard 9 is a housing or enclosing receptacle 12 having an outlet spout 13 at one side thereof and provided in its base 14 with a central opening 15 surrounded by the inwardly directed neck 16.

The motor shaft 17 projects upwardly and engaging over the upper end of the shaft 17 is a hub 18 projecting downwardly from the plate 19. This hub is provided with a pair of peripheral grooves 20, in each of which is positioned a split resilient band having an inwardly turned end 22 projected through an opening 23 formed in the hub 18 and engaging in a cut away portion 24 of the shaft 17 so as to engage against the shoulder 25 and effect a rotation of the plate 19 in unison with the shaft 17.

The plate 19 is secured by welding or in any other suitable manner to the base portion 26 of a receptacle having a perforated wall 27 and provided at its upper end with an inwardly projecting abutment flange 28. As shown in Fig. 1, a portion of the plate 19 projects through an opening 29 formed in the base 26. By forming this opening with flat sides so that the opening forms a square or other type of polygon, and by providing the portion of the plate 19 which extends into the opening with flat faces, the engagement of such portion in the opening will facilitate the rotation of the base 26.

Formed in the upper face of plate 19 is a recess 30 which is flat faced and provided with a central flat faced pocket 31. This plate 19 serves as an attachment for the receptacle embodying the base 26 and forms a part of the bottom thereof. Plate 19 also serves as an actuating member for effecting the rotation of the macerating means. The macerating means comprises a disk 32. This disk 32 is provided with slots 33 in which engage plates 34 formed T-shaped in cross section, the arms 35 of the T resting against the under face of the plate 32 and secured thereto by welding or in any other suitable manner. It is believed obvious that if desired, the plates may be inserted in the slots 33 by a press fit. In the construction shown some of these plates are provided with a straight upper edge and some of them are serrated to provide the teeth 36. Both types of plates project upwardly beyond the upper face 37 of the plate 32. The upper face 37 is also provided with sharp-edged pockets 38 which serve to co-operate with the plates in effecting the macerating.

Secured to the under face of the plate 32, by means of screws 39, is a guide plate 40 having a boss 41 projecting outwardly, centrally thereof, from one side thereof. This boss is of a size to snugly fit in the pocket 31, and is shaped in cross section to conform to the shape of the pocket 31. Likewise, the plate 40 is of a size and shape to snugly fit in the recess 30 so that when the plate 19 is rotated, the plate 32 will also be rotated.

The housing on receptacle 12 is provided with a cover 42 which is secured in position by means of the spring clasp 43'. Supported by the cover 42, and preferably formed integral therewith, is a chute 43 having a passage 44 therethrough which opens at its lower end in overlying relation to the macerating plate 32 in spaced relation thereto, and eccentric thereof. Projecting downwardly from the lower end of the chute 43 are teeth 45 which are adapted to interlace with the teeth 36 when the plate 32 rotated. Extending outwardly from the lower or inner end of chute 43 and having its lower face 46 flush with the end face of the chute is a deflecting plate 47 which serves to prevent the macerated pulp from being thrown upwardly after it has been carried clear of the chute 43.

Projecting upwardly from the plate 40, centrally thereof, and extending through the plate 32, at the center thereof, is a stub shaft 48 having a reduced portion 49 projecting through an opening 50 formed in the deflecting plate 47. It will be noted that there is a clearance between the reduced portion 49 and the opening 50. It will also be noted that this opening 50 is smaller than the stub shaft 48. The washer 51 is secured on the reduced portion or stem 49 by means of the cotter pin 52.

The construction is such that when the cover is placed in position, as shown in Fig. 1, the parts 40 and 41 will have fitted in the recess 30 and pocket 31 so that an operation of the motor 10 will effect a rotation of the receptacle, having the perforated wall and also a rotation of the plate 32. This rotation will be from right to left in Fig. 1 so that the blades will pass across the open end of the chute 43 and macerate material projected from the end of the chute, carrying this severed, macerated material into engagement with the teeth 45 where further maceration will take place. Plate 32 will carry this macerated material around and propel the same outwardly by centrifugal action, into the receptacle having the perforated wall. The solid matter will be retained in the receptacle while the juices will be forced through the openings in the wall, to be deposited in the housing or receptacle 12.

When the cover 42 is removed, the plate 32 will be removed with it so that no macerating means are left exposed in the perforating receptacle after the cover has been removed.

With the construction of this type the various advantages sought will be obtained, as well as others, which will appear from the mechanism described, and the disadvantages and undesirable features referred to are obviated.

The house or receptacle 12 is secured in position on the standard 9 by means of a set screw 55.

What I claim as new is:

1. In a juice extractor of the class described, a rotatable receptacle having perforations formed in the side wall thereof; a base on said receptacle; a means for rotating said receptacle; connecting means attached to said base for connecting the same to said rotating means; a housing for enclosing said receptacle for reception of juices issuing therefrom; a cover member on said housing; a rotatable macerating member carried by said cover; and interengaging means on said macerating member and said base coacting, when said cover is in covering position, to effect a rotation of said macerating member in unison with said base.

2. In a juice extractor of the class described, a rotatable receptacle having perforations formed in the side wall thereof; a base on said receptacle; means for rotating said receptacle on the axis of said base; connecting means engageable with said base for connecting the same to said rotating means; a housing for enclosing said receptacle for reception of juices issuing therefrom; a cover member on said housing and movable to operative and inoperative position; a rotatable macerating member carried by said cover; interengaging means on said macerating member and said base coacting, when said cover is in operative position to effect a rotation of said macerating member in unison with said base.

3. In a juice extractor of the class described, a rotatable perforated receptacle having a bottom; means for rotating said receptacle about the axis of its bottom; a housing enclosing said receptacle for the reception of juices issuing therefrom; a stationary chute supported on said housing and projecting inwardly of said receptacle and terminating at its inner end in spaced relation to said bottom; a macerating member carried by said chute and rotatable relatively thereto and positioned between the end of said chute and said bottom; and means for rotating said macerating member in unison with said bottom.

4. In a juice extractor of the class described, a perforated receptacle having a bottom and being rotatable on the axis of its bottom; means for rotating said receptacle; a housing enclosing said receptacle and adapted for reception of juices issuing therefrom; a cover member supported on said housing and movable relatively thereto to operative and inoperative position; a feeding chute carried by said cover member and projectable at one end into said receptacle upon movement of said cover member to operative position, said chute terminating at its inner end in spaced relation to said bottom; a macerating member positioned between said bottom and the inner end of said chute; means for rotating said macerating member in unison with said bottom; and means rotatably connecting said macerating member to said cover member.

5. In a juice extractor of the class described, a rotatable perforated receptacle having a bottom; means for rotating said receptacle about the axis of its bottom; a housing for enclosing said receptacle for reception of juices issuing therefrom; connecting means for connecting said bottom to said rotating means, said connecting means having a flat-faced recess opening into said receptacle; a macerating member; means carried by said macerating member engaging in said recess for effecting a rotation of said macerating member in unison with said bottom; a cover member for said housing; and means for rotatably connecting said macerating member to said cover member.

6. In a juice extractor of the class described, a perforated receptacle having a bottom and rotatable about the axis of its bottom; means for rotating said receptacle; a housing for enclosing said receptacle for the reception of juices issuing therefrom; a stationary chute supported on said housing and extending at one end inwardly of said receptacle eccentric of said bottom; a macerating member positioned between the inner end of said chute and said bottom; means for rotating said macerating member in unison with said receptacle; and means extending eccentrically of said receptacle for rotatably connecting said macerating member to said chute.

7. In a juice extractor of the class described, a rotatable perforated receptacle having a bottom; means for rotating said receptacle; a housing for enclosing said receptacle for the reception of juices issuing therefrom; a cover member supported on said housing; a stationary chute mounted on said cover member and projecting at one end inwardly of said receptacle and terminating in spaced relation to said bottom eccentric thereof; a macerating member positioned between said bottom and said end of said chute; means for rotating said macerating member in unison with said bottom; and means located centrally of said bottom for connecting said macerating member to said chute in rotatable relation thereto.

RICHARD E. DRACHENBERG.